United States Patent [19]
Janot et al.

[11] Patent Number: 5,888,558
[45] Date of Patent: Mar. 30, 1999

[54] APPARATUS FOR CUTTING EXTRUDED FOOD PRODUCTS TO PROVIDE SURFACE EFFECTS

[75] Inventors: Denis Janot, Fouilloy; Laurent Sisiak, Amiens, both of France

[73] Assignee: Nestec S.A., Vevey, Switzerland

[21] Appl. No.: 755,568

[22] Filed: Nov. 27, 1996

[30] Foreign Application Priority Data

Nov. 29, 1995 [EP] European Pat. Off. .......... 95203277.9

[51] Int. Cl.$^6$ .......................... B29C 47/30; A21C 11/16
[52] U.S. Cl. .......................... 425/313; 426/516; 426/518
[58] Field of Search ................... 425/311, 313; 426/516, 518, 862, 863, 678

[56] References Cited

U.S. PATENT DOCUMENTS

| | | | |
|---|---|---|---|
| 2,567,248 | 9/1951 | Stahmer | 426/518 |
| 2,836,825 | 5/1958 | Schnell | 426/518 |
| 3,892,834 | 7/1975 | Pritchard | 264/142 |
| 4,422,372 | 12/1983 | Hoezcee | 425/311 |
| 4,802,838 | 2/1989 | Schaaf | 425/311 |
| 5,304,055 | 4/1994 | Van Lengerich et al. | 425/311 |
| 5,338,559 | 8/1994 | Schaaf | 425/311 |
| 5,641,529 | 6/1997 | Kunas | 425/311 |

FOREIGN PATENT DOCUMENTS

| | | |
|---|---|---|
| 3940722 | 6/1991 | Germany . |
| 61-63237 | 4/1986 | Japan .......... 426/518 |
| 61-280260 | 12/1986 | Japan . |

OTHER PUBLICATIONS

Derwent Abstract No. C91–077237, WPI Database Accession No. 9 1–178940/25 of Kohler, German Patent Application No. DE 39 40 722 A1 (1991).
Derwent Abstract No. C87–010312, WPI Database Accession No. 87–024730/04 of Ooyama, Japaness Kokai No. 61–280260 (Dec. 1987).

Primary Examiner—Robert Davis
Attorney, Agent, or Firm—Vogt & O'Donnell, LLP

[57] ABSTRACT

Apparatus for extruding a food product substance and for cutting the extrudate from a die of an extrusion head of the extruder into pieces has a rotary shaft and a knife which is affixed to the shaft and which has two blades, each blade having a cutting edge, wherein the two blades are offset one from another so that one blade extends from the axis of shaft rotation for a distance from the shaft rotation axis for a distance greater than that of the other blade and wherein the shaft and blades and the blade cutting edges are configured and positioned with reference to the extrusion head and wherein each die is positioned so that upon exit of extrudate from each die and upon rotation of the shaft, one blade cutting edge cuts and incises a part of the extrudate substance and the other blade cuts the extrudate substance to obtain a cut piece so that the cutting by the two blades provides a cut piece having an incised part.

4 Claims, 2 Drawing Sheets

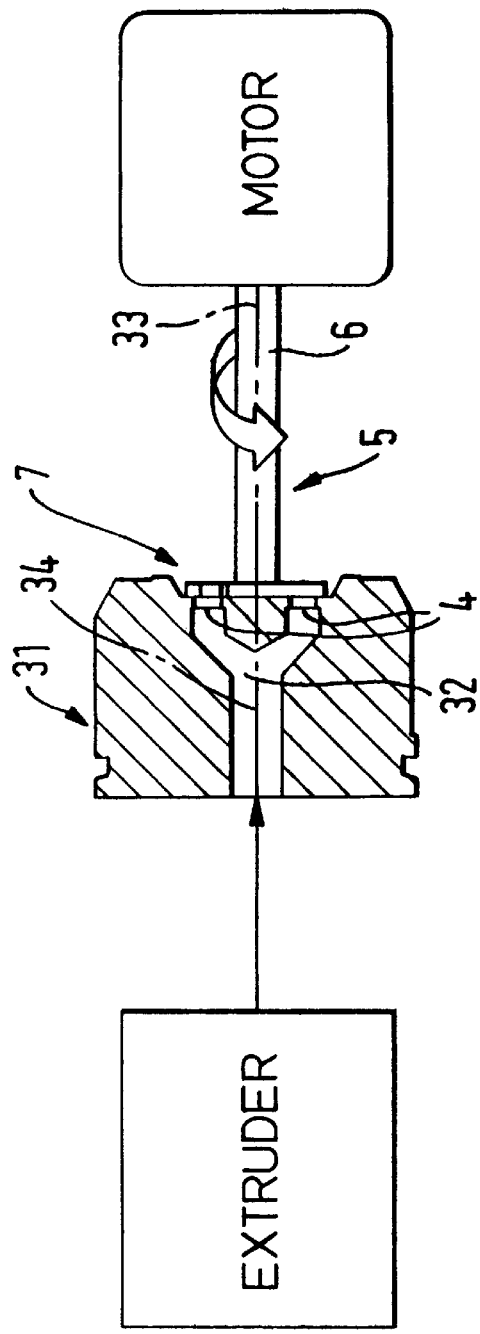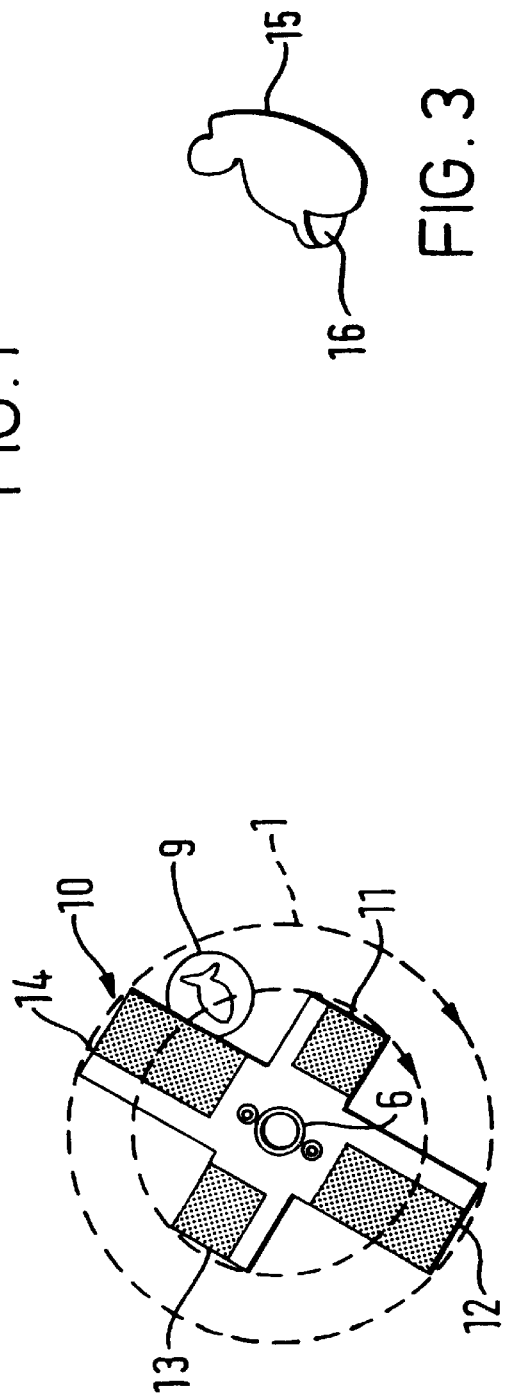

ific effects. By way of example, the exit die has the

APPARATUS FOR CUTTING EXTRUDED FOOD PRODUCTS TO PROVIDE SURFACE EFFECTS

BACKGROUND OF THE INVENTION

The invention relates to apparatus for cutting an extrudate at the exit of dies of a baking/extrusion system with a rotary cutter wherein a shaft supports a plurality of cutting edges.

It is already known to arrange a cutting apparatus at the exit of an extrusion apparatus, in particular in the field of animal food, in order to obtain dry food pieces having the shape given by the extrusion die. Japanese Patent Document 86 280 260, in the name of KK Ooyama Foods Machinery, relates to an apparatus which is for manufacturing pet food and includes, at the exit of the extrusion die, two rotary knives supported by a shaft whose axis is parallel to the axis of the extruder, one of the knives making it possible to make an incision in the product, and the second allowing the product to be cut fully. The drawback of this apparatus is that the axis of the knife is offset with respect to the axis of the extruder, the result of which is that the blades of the knife rotate through air over a large part of their rotation circumference, which may raise problems of safety (fairing) and adjustment of the blades because the centrifugal force is great. Furthermore, this cutting apparatus can only be used with a single product exit die.

SUMMARY OF THE INVENTION

The object of the present invention is to provide a cutting apparatus which raises no safety problem, has no risk of de-adjustment and can be used for an extruder which may include a plurality of exit dies.

The invention provides an apparatus for cutting at the exit of dies of a baking/extrusion system and comprises a rotary shaft supporting a plurality of cutting edges so that the axis of rotation of the shaft coincides with that of the baking/extrusion system and comprises cutting edges which have different lengths, are discontinuous, or are non-linear.

DETAILED DESCRIPTION OF THE INVENTION

The apparatus according to the invention makes it possible to manufacture dry animal food or breakfast cereals with minor surface effects (ears, gills, sliced carrots) or major surface effects (mouth, paws). The apparatus can be used for manufacturing any products extruded on a single-screw or double-screw machine, or any other machine which allows a dough to be pressed through one or more dies. The apparatus according to the invention is placed directly at the exit of the dies, and the rotation of the cutting means is set to the speed appropriate for obtaining the desired product, that is to say, the thickness of the desired dry food or cereal. The initial dough may optionally be coloured.

When using the apparatus, ingredients to make a dough, namely flour, water, sugar, flavourings and colours, are mixed in a first compartment of an extruder, and the dough thus formed is heated progressively to bake it and is pressed through a variable number of dies having the desired dry food or cereal shape, for example, cat, mouse, fish, carrot, or other animal or vegetable shapes, or geometrical shapes. At the exit of the die, the column is cut using the apparatus according to the invention, which has one or more cutting edges (knives) whose arrangement makes it possible to obtain the various surface effects.

In the context of the present description, the case in which the cutting edges have different lengths is referred to herein as "alternate cutting". The case in which the cutting edges are discontinuous is referred to as "offset cutting". Finally, the case in which the cutting edges are non-linear is referred to as "ribbed cutting".

In the context of the present description, the term "cutting edges of different lengths" means cutting using knives distributed at an angle about the axis of rotation of the shaft, with two successive knives not having the same size. These knives cut perpendicularly to the axis of the baking/extrusion system, which is also true in the case of discontinuous and non-linear cutting edges. In the case of cutting edges of different lengths, the cutting apparatus consists of at least two knives of different lengths arranged symmetrically with respect to the axis of rotation of the shaft.

The general principle is based on the fact that the shortest knife incises the extrusion column at the exit of the die to cause the appearance of a major surface effect, such as a fish's mouth or cat's paw, and the second knife fully detaches the dry food pieces thus incised.

In a preferred embodiment, the cutting edges of different lengths include four knives of different length arranged at right angles. In this case, the two knives arranged symmetrically with respect to the axis of rotation of the shaft have the same length. The two longest knives have substantially twice the length of the shortest knives.

This knife geometry makes it possible to make major surface effects. By way of example, the exit die has the shape of a cat or fish, and two paws of the cat or a mouth hole of the fish are obtained. The distance between the paws or the aperture of the mouth is associated with the natural expansion of the product at the die exit and also with a suitable cutting angle. Specifically, the angle of the small knife (angle of attack) will cause the two symmetrical parts incised to be separated (2 lips, 2 paws).

This cutting technique is used for two different products, namely dry food pieces in the shape of a cat with two paws or dry food pieces in the shape of a fish with its mouth open. It may also be applied to other types of products, for example breakfast cereals or confectionery products.

In the context of the present invention, the term "discontinuous cutting edges" means that the cutting edges provided have at least one knife with two offset blades, the blades having substantially the same length and being arranged at different distances from the axis of rotation of the shaft.

The general principle is based on the fact that the knife thus cuts the extrusion column at the exit of the die in two steps. The first part of the knife cuts a part of the dry food piece, while the column continues to emerge before the second part of the knife cuts it. This causes the appearance of a minor surface effect (fish gills, mouse ears). The second part of the knife fully detaches the dry food piece thus cut.

As before, the surface effect is associated with the natural expansion of the product at the exit of the die, and also with a suitable cutting angle. In fact, the angle of the blade located closest to the axis of rotation of the shaft (angle of attack) will cause the first incised part (gill, ear) to be separated.

Thus, this cutting technique is used for two different products, namely dry food pieces in the shape of a mouse with an ear and dry food pieces in the shape of as a fish with a gill, and this apparatus also can be used for breakfast cereals or confectionery products.

In a particular embodiment, use is made of discontinuous cutting edges including two knives with offset blades, the knives being arranged symmetrically with respect to the axis of rotation of the shaft.

In a last embodiment of the apparatus according to the invention, operation is carried out with non-linear cutting edges. To achieve this end, the cutting edge used is at least one knife with a serrated blade. This means that the cutting offset due to the serrations will give a ribbed product. The knife cuts the extrusion column in such a way that, by virtue of the natural expansion of the extrudate, irregular surface expansion is made possible (non-smooth cut). This cutting technique has been used for preparing dry food with a sliced-carrot shape. It can also be used for breakfast cereals or confectionery products.

In a preferred embodiment, the apparatus with non-linear cutting edges includes two knives arranged symmetrically with respect to the axis of rotation of the shaft.

The great benefit of the apparatus according to the invention is that the cutting edges are mounted on a rotary shaft and are in a single piece (monobloc with one or more knives) whereas the cutting system includes two parts in the case of the aforementioned Japanese patent.

The rest of the description is given with reference to drawing Figures.

BRIEF DESCRIPTION OF THE DRAWING FIGURES AND APPARATUS OPERATION

FIG. 1 represents an extruder with a the cutting system.

FIG. 2 represents an apparatus according to the invention for alternate cutting.

FIG. 3 represents a product obtained with the apparatus of FIG. 2.

DETAILED DESCRIPTION OF THE DRAWING FIGURES

Figure 4:
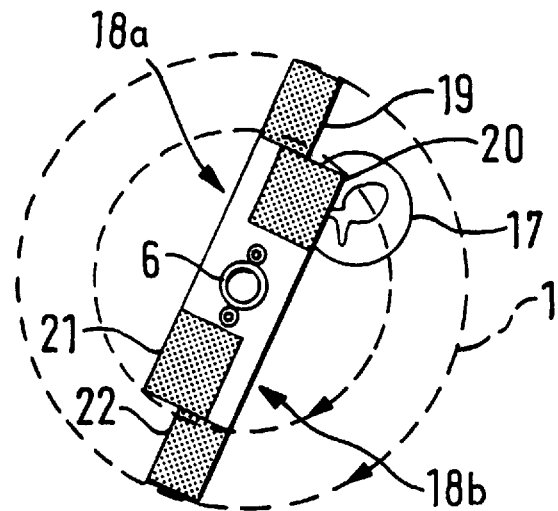
FIG. 4 represents an apparatus according to the invention for offset cutting.

With reference to FIG. 1, in operation of the present invention, a baking/extrusion apparatus represented by a labelled box, such as of the double-screw type, feeds a dough to an extrusion head (31) via conduits (32) ending at the extrusion dies (4). The dough is obtained by upstream mixing of all the required ingredients, namely flour, water, sugar, flavourings and colours. The extruder has a temperature profile allowing 130° C. to be reached with a transit time of the order of 30 seconds.

The apparatus according to the invention, which comprises a shaft (6) supporting the cutting means (7), is placed at the exit of the dies, the shaft being rotated in the direction of the arrow using a motor (represented by a labeled box). The speed of rotation of the shaft is matched to the exit flow rate of the extrusion column, taking into account the desired thickness of the final product. With a flow rate on the order of 300 kg/h, the shaft should be rotated at a speed of about 2000 rpm. The axis (33) of rotation of the shaft coincides with an axis of the baking/extrusion system.

FIG. 2 represents a view of an extruder (1) of the alternate-cutting system from an end of an extruder and arranged at the exit of a die (9) which has a fish shape. A single die (9) is represented, but several may be provided. The rotary shaft (6) has cutting means (10) made integrally with 4 knives (11, 12, 13, 14), of which two (11, 13) are short knives and two (12, 14) are long knives. The cutting part of the knives is shaded. In operation, an extrusion column emerges from the die (9) and the cutting means, driven by a motor (FIG. 1), rotate clockwise. The knife (11) slits the head of the fish to make an open mouth in it and the knife (14) then fully detaches the fish. The column continues to emerge, and the knife (13) makes an open mouth and the knife (12) detaches the fish which provides for obtaining a fish (15) having an open mouth (16) as represented in FIG. 3. This operation is repeated with each pair of knives creating a new fish.

Figure 5:
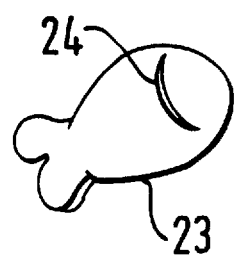
FIG. 5 represents a product obtained with the apparatus of FIG. 4.

FIG. 4 represents an offset cutting apparatus arranged at the exit of an extruder (1). A single fish-shaped die (17) is illustrated, but there may be several of them. The shaft (6) supports the cutting means comprising two knives (18a, 18b) which, as illustrated, extend longitudinally transversely from the shaft (6) and which are formed integrally, each of these knives consisting of two blades, respectively (19, 20) and (21,22) which extend longitudinally along the length of each knife and which are offset laterally one from another so that one blade (19,22) of each knife (18a, 18b) extend away from the shaft (6) for a distance greater than that of the other blade (20,21). In operation, an extrusion column emerges from the die (17) and the knives, driven by a motor rotate clockwise. The blade (20) incises the body of the fish to form a gill and the blade (19) completes the cutting of the head which provides for obtaining a fish (23) having a gill (24) as shown in FIG. 5. Because of the expansion of the product, it is the corner of the blade (20) which allows the gill to be formed. The knives continue to rotate and the blades (21) and (22) cut a new fish, and so on.

Figure 6:
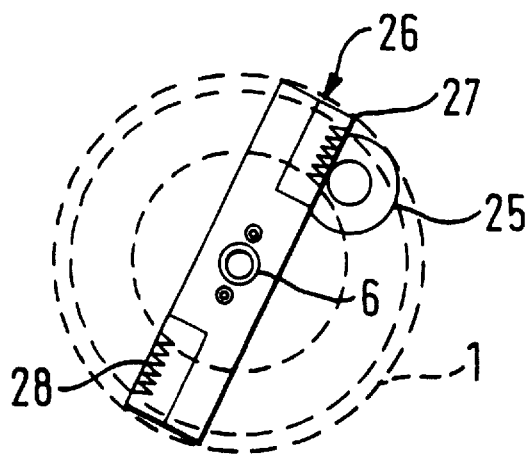
FIG. 6 represents an apparatus according to the invention for ribbed cutting.
Figure 7:
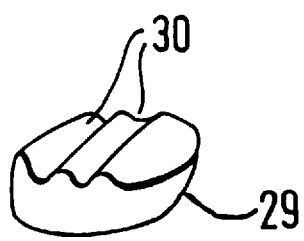
FIG. 7 represents a product obtained with the apparatus of FIG. 6.

FIG. 6 represents a view of a ribbed-cutting apparatus from an end of an extruder and arranged at the exit of the die (25). A single of die (25) is represented, but there may be several of them. The shaft (6) supports the cutting means (26) which are integral and have serrated knives (27,28). In operation, an extrusion column emerges from the die (25) and the cutting means (26) rotate clockwise. The knife (27) cuts the column in a ribbed configuration which provides for obtaining a carrot (29) having ribs (30) as shown in FIG. 7. The extrusion column continues and the knife (28) cuts a new portion.

The apparatus according to the invention can be employed in the field of animal food (dry food), but applications relating to breakfast cereals and confectionery products are also envisageable.

We claim:

1. In apparatus for extruding a food product substance and for cutting the extruded food product substance into pieces wherein an extruder has an extrusion head which contains a conduit portion for passage of the substance and which has a die for exit of extrudate substance from the extrusion head wherein the die is at a position displaced a distance from a position of a central portion of the extrusion head and wherein a cutting device comprising a rotatable shaft and a knife which comprises a cutting blade edge, wherein the knife and cutting blade edge extend perpendicularly from the axis of shaft rotation, is positioned for cutting extrudate exiting a die, perpendicular to the direction of extrudate flow from the die, into pieces, the improvements comprising:

a knife affixed to the shaft wherein the knife extends longitudinally transversely from the shaft and comprises two blades, each blade having a cutting edge, wherein the two blades extend longitudinally along a length of the knife and are offset laterally one from another so that one blade extends away from the shaft for a distance greater than that of the other blade and wherein the shaft and blades and the blade cutting edges are configured and positioned with reference to the extrusion head and wherein each die is positioned so that upon exit of extrudate from each die and upon rotation of the shaft, one blade cutting edge cuts and incises a part of the extrudate substance and the other blade cuts the extrudate substance to obtain a cut piece so that the cutting by the two blades provides a cut piece having an incised part.

2. Apparatus according to claim 1 wherein there are two knives, wherein each knife comprises the two offset blades and cutting edges, and wherein the two knives are positioned symmetrically with respect to the shaft rotation axis.

3. Apparatus according to claim 2 wherein the two knives are integrally formed.

4. Apparatus according to claim 2 or 3 wherein there are at least two dies and wherein the dies are positioned symmetrically at positions displaced from the central portion of the extrusion head and so that upon extrudate exit and upon rotation of the knives, the cutting edges incise and cut the extrudate into incised pieces.

* * * * *